US012673772B2

(12) United States Patent
Khankal et al.

(10) Patent No.: US 12,673,772 B2
(45) Date of Patent: Jul. 7, 2026

(54) HYBRID LIFEVEST SOFT POUCH

(71) Applicant: Safran Seats USA LLC, Gainesville, TX (US)

(72) Inventors: Yogesh Khankal, Denton, TX (US); Jared Robinson, Bowie, TX (US); Marshall Mosty, Denton, TX (US); Michael Reeves, Nocona, TX (US)

(73) Assignee: Safran Seats USA LLC, Gainesville, TX (US)

( * ) Notice: Subject to any disclaimer, the term of this patent is extended or adjusted under 35 U.S.C. 154(b) by 76 days.

(21) Appl. No.: 18/029,756

(22) PCT Filed: Oct. 30, 2020

(86) PCT No.: PCT/US2020/058266
§ 371 (c)(1),
(2) Date: Mar. 31, 2023

(87) PCT Pub. No.: WO2022/093268
PCT Pub. Date: May 5, 2022

(65) Prior Publication Data
US 2023/0382534 A1      Nov. 30, 2023

(51) Int. Cl.
B64D 11/06          (2006.01)
(52) U.S. Cl.
CPC ................................ B64D 11/0631 (2014.12)
(58) Field of Classification Search
None
See application file for complete search history.

(56) References Cited

U.S. PATENT DOCUMENTS 3,575,225 A * 4/1971 Muheim ................ A61B 50/36
                                              426/123
3,623,683 A * 11/1971 Bennett .................. B64D 11/00
                                              244/122 A
(Continued)

FOREIGN PATENT DOCUMENTS

CA        2993553 C    *   2/2021    ......... B64D 11/0631
EP        3354556 A1      8/2018
(Continued)

OTHER PUBLICATIONS

International Patent Application No. PCT/US2020/058266, International Search Report and Written Opinion, dated Jun. 21, 2021.
(Continued)

*Primary Examiner* — David R Dunn
(74) *Attorney, Agent, or Firm* — Kilpatrick Townsend & Stockton LLP

(57) ABSTRACT

Described is a hybrid lifevest enclosure having a base, a frame assembly, and an attachment member for coupling the base to the frame assembly. The base may be formed of a flexible material and the frame assembly may be formed of a rigid material. The hybrid lifevest enclosure may comprise a sealed configuration in which the base is coupled to the frame assembly in a manner that prevents insertion of a foreign object having a length of 9.9 cm and a diameter of 0.9 cm into the sealed configuration without evidence that the sealed configuration has been unsealed. The hybrid lifevest enclosure may also comprise a sealed configuration that complies with Design for Safety requirements.

20 Claims, 3 Drawing Sheets

(56) References Cited

U.S. PATENT DOCUMENTS

| | | | | | |
|---|---|---|---|---|---|
| 4,449,588 | A * | 5/1984 | Benlolo | ................ | A62C 13/78 |
| | | | | | 169/48 |
| 4,998,587 | A * | 3/1991 | Thomas | ................ | A62C 13/78 |
| | | | | | 169/51 |
| 6,082,816 | A * | 7/2000 | Gottlieb | ................ | A47C 7/626 |
| | | | | | 297/188.1 |
| 6,523,713 | B1 * | 2/2003 | Helms | ................ | B29C 66/131 |
| | | | | | 220/780 |
| 7,077,466 | B2 * | 7/2006 | Forstner | ................ | B64D 25/04 |
| | | | | | 297/188.08 |
| 7,252,569 | B2 * | 8/2007 | Everhart | ................ | B64D 11/06 |
| | | | | | 206/769 |
| 7,530,631 | B2 * | 5/2009 | Skelly | ................ | B64D 11/064 |
| | | | | | 297/188.21 |
| 10,668,998 | B2 * | 6/2020 | Tassie | ................ | B64D 11/0631 |
| 2005/0062319 | A1 * | 3/2005 | Hough | ................ | B64D 11/0631 |
| | | | | | 297/188.08 |
| 2008/0106127 | A1 * | 5/2008 | Hough | ................ | B64D 11/0629 |
| | | | | | 297/188.08 |
| 2009/0001779 | A1 * | 1/2009 | Wieland | ................ | B64D 11/06 |
| | | | | | 224/400 |
| 2013/0038473 | A1 * | 2/2013 | Lamoree | ................ | B64D 25/18 |
| | | | | | 297/188.08 |
| 2013/0308880 | A1 * | 11/2013 | Jenkins | ................ | B65D 73/0014 |
| | | | | | 383/42 |
| 2015/0034641 | A1 | 2/2015 | Aruga | | |
| 2015/0284095 | A1 * | 10/2015 | Pozzi | ................ | B64D 11/0648 |
| | | | | | 297/188.08 |
| 2018/0215470 | A1 * | 8/2018 | Wickham | ................ | B65D 33/16 |
| 2019/0077491 | A1 * | 3/2019 | Schalla | ................ | B63C 9/23 |
| 2019/0077559 | A1 * | 3/2019 | Lumsden | ................ | B65D 55/026 |
| 2019/0233121 | A1 | 8/2019 | Wunderlich et al. | | |
| 2023/0081750 | A1 * | 3/2023 | Zachäus | ................ | B64D 45/0015 |
| | | | | | 324/133 |

FOREIGN PATENT DOCUMENTS

| | | | | | |
|---|---|---|---|---|---|
| GB | 2519180 | A * | 4/2015 | ................ | B64D 11/00 |
| WO | 2007009106 | A1 | 1/2007 | | |

OTHER PUBLICATIONS

European Application No. 20811896.8, Office Action mailed on Oct. 31, 2024, 6 pages.

Europe Appl. No. 20811896.8, Intention to Grant, Nov. 6, 2025, 7 pages.

* cited by examiner

100

10

HYBRID LIFEVEST SOFT POUCH

FIELD OF THE INVENTION

The field of the invention relates to lifevest enclosures, in particular for use in aircrafts.

BACKGROUND

For safety, aircrafts are required to have lifevests on board in case of emergency. These lifevests are often stored in enclosures or housings, which are positioned within the cabin of the aircraft so to be readily and easily accessible by a passenger, for example, under a seating surface of a passenger seat. Currently, lifevest enclosures are often formed as rigid, or hard, structures or as flexible structures made from flexible materials such as a fabric. Lifevest enclosures formed of flexible materials can often collapse under its own weight, thereby creating gaps through which foreign objects can enter. Thus, these flexible lifevest enclosures are prone to damage and often do not meet Design for Safety ("DFS") requirements, specifically Regulation No. ARP5526. On the other hand, rigid lifevest enclosures are often larger and heavier, thereby increasing the overall weight of an aircraft. Thus, it is desired to have a lifevest enclosure that meets DFS requirements, without adding additional weight.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a hybrid lifevest enclosure includes a base for receiving a lifevest, a frame assembly, and at least one attachment member positioned between the frame assembly and the base for coupling the base to the frame assembly. The frame assembly may be formed of a rigid material, and the base may be formed of a flexible material. The hybrid lifevest enclosure may include a sealed configuration in which the base is coupled to the frame assembly in a manner that prevents insertion of a foreign object having a length of 9.9 cm and a diameter of 0.9 cm into the sealed configuration without evidence that the sealed configuration has been unsealed. The sealed configuration may comply with Regulation No. ARP5526.

In some embodiments, the flexible material is fabric. The fabric may include at least one of a nylon, coated nylon, carbon foam, polybenzimidazole (PBI) fiber, canvas, polyester, coated fabric, duck cloth, tweed, bamboo, synthetic fabric, organic fiber, synthetic rubbers, or acrylic.

In some embodiments, the rigid material may include at least one of low-density polyethylene, high-density polyethylene, polypropylene, polystyrene, polytetrafluoroethylene, polyvinyl chloride, or polychlorotrifluoroethylene. The rigid material may have a tensile strength of at least 35 MPa.

In some embodiments, the frame assembly is pivotable relative the base. Moreover, the frame assembly may include a first frame member and a second frame member.

In some embodiments, the hybrid lifevest enclosure has a weight of less than 0.685 lbs.

In some embodiments, Regulation No. ARP5526 may require that a foreign object having a length of 9.9 cm and a diameter of 0.9 cm cannot be inserted with in the sealed configuration lifevest enclosure without evidence that the sealed configuration has been unsealed.

DETAILED DESCRIPTION

Figure 1:
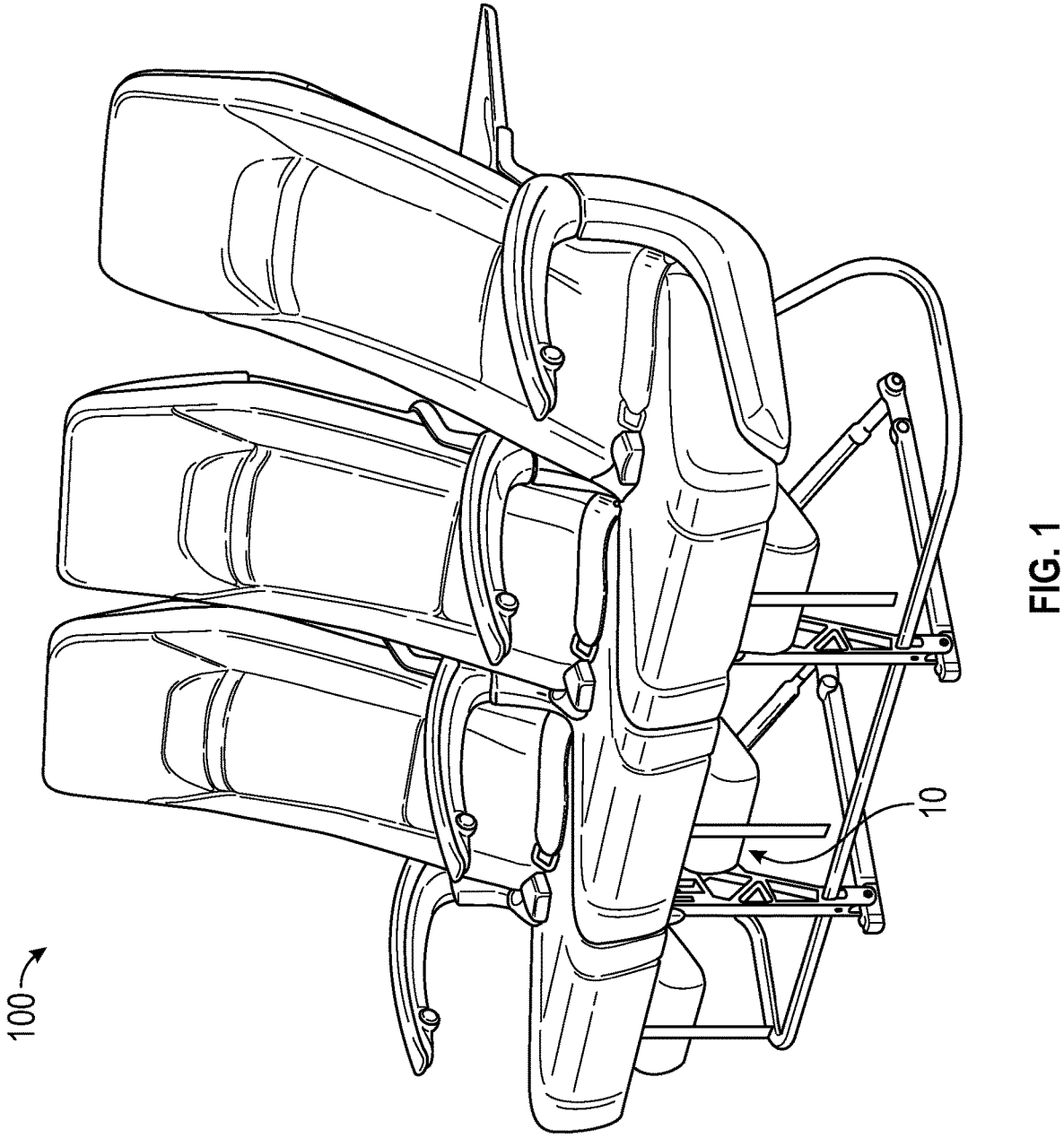
FIG. 1 is a perspective view of a passenger seat having a lifevest hybrid enclosure installed thereon, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a hybrid lifevest enclosure for passenger seats. While the lifevest enclosure 10 is discussed for use with aircraft seats, it is by no means so limited. Rather, embodiments of the lifevest enclosure 10 may be used in passenger seats or other seats of any type or otherwise as desired.

According to certain embodiments of the present invention, as shown in FIGS. 1-4, a lifevest enclosure 10 comprises a base 12, a frame assembly 20, and an attachment member 30.

In some embodiments, as illustrated in FIGS. 1-4, the base 12 may comprise an outer housing having a top side 12A, an opposing bottom side 12B, and peripheral sides 12C extending between the top side 12A and the bottom side 12B, thereby forming an interior space of the base 12. The base 12 may further include at least one support member 14 coupled to a surface of the top side 12A for coupling the lifevest enclosure 10 to a seat tube (not shown) of a passenger seat 100. The lifevest enclosure 10 may include one or more support members 14. For example, in some embodiments, as illustrated in FIGS. 1-4, the lifevest enclosure 10 comprises two support member 14. However, the lifevest enclosure may include any suitable number of support members 14.

The base 12 may be formed of a flexible material, such as, for example, a fabric material. Examples of such a fabric material may include, but are not limited to, nylon, coated nylon, carbon foam, polybenzimidazole (PBI) fiber, canvas, polyester, coated fabric, duck cloth, tweed, bamboo, synthetic fabric, organic fiber, synthetic rubbers, acrylic, or any other suitable flexible material. The term "flexible material" is understood to mean a material having a construction in which the outer shape is not maintained by a fixed framework. For example, a balloon has a nonrigid construction. In some embodiments, the base 12 may be formed of a flexible material that is also flame resistant.

Figure 4:
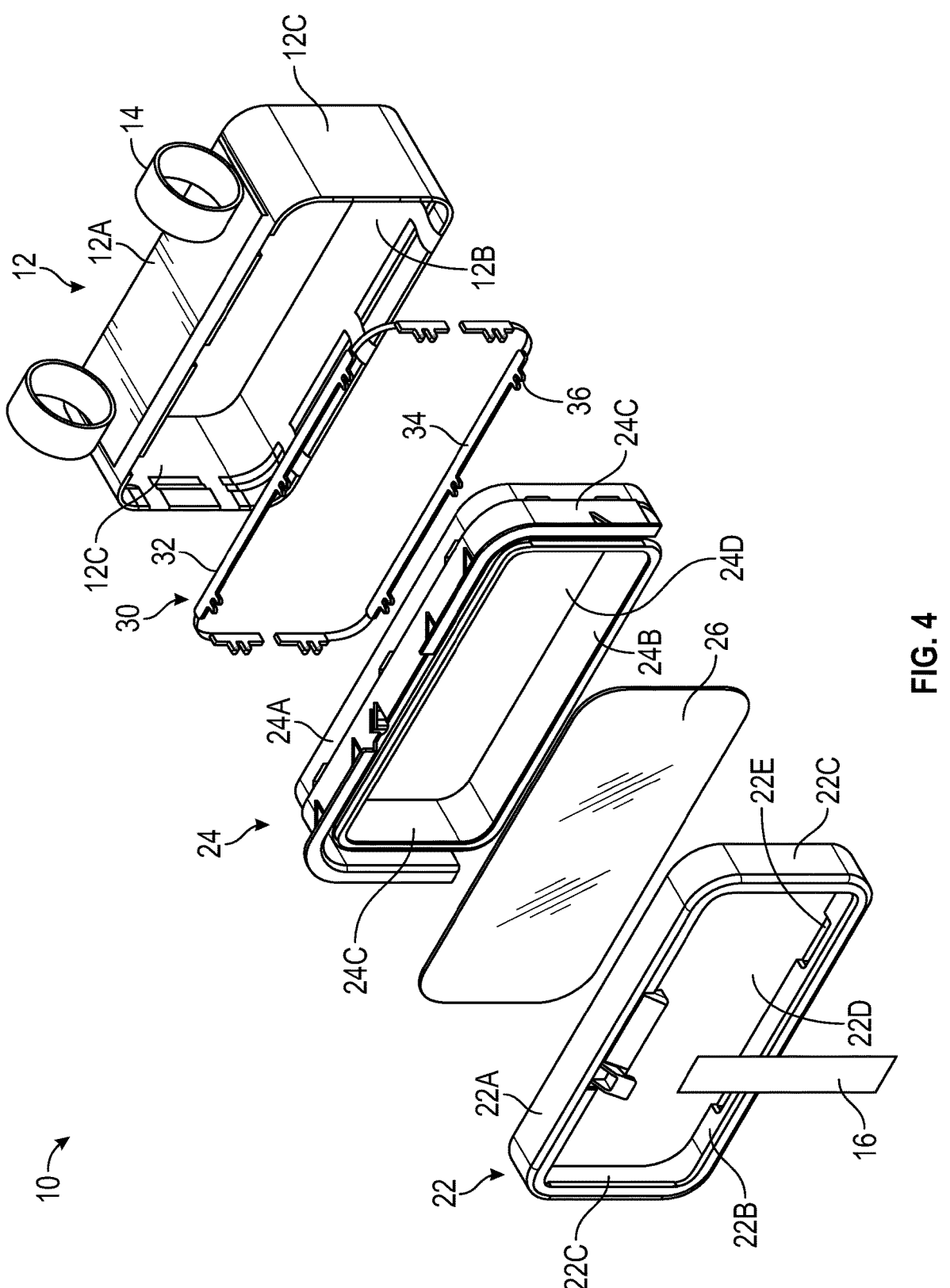
FIG. 4 is an exploded view of the lifevest enclosure of FIG. 1.

In some embodiments, as best shown in FIG. 4, the frame assembly 20 may comprise a first frame member 22, a second frame member 24, and a door member 26. The first frame member 22 may include a top side 22A, a bottom side 22B opposite the top side 22A, and peripheral sides 22C extending between the top side 22A and the bottom side 22B, thereby forming a perimeter of the first frame member 22. The first frame member 22 may further include an opening 22D within the perimeter formed by the top side 22A, bottom side 22B, and peripheral sides 22C. The first frame member 22 may further include at least one notch member 22E disposed on the bottom side 22B. The notch member 22E may be formed as a recess or depression on an upper surface of the bottom side 22B. While the notch member 22E is illustrated on a bottom side 22B, the notch member 22E may be formed in other suitable locations of the first frame member 22 (e.g., top side 22A, peripheral side 22C). In some embodiments, as illustrated in FIG. 4, the first frame member 22 may include two notch members 22E. However, the first frame member 22 may include any suitable number of notch members 22E. The first frame member 22 may further include a tab 28 formed along an upper portion (e.g., top side 22A) of the first frame member 22. The tab 28 may be a breakable seal to detect when tampering of the lifevest enclosure 10 has occurred. For example, the tab 28 may be arranged so that it is broken when the lifevest enclosure 10 has been opened, thereby providing an indicator that the lifevest enclosure 10 is compromised. In some embodiments, the lifevest enclosure 10 may include a sticker seal in addition to and/or in place of the tab 28 as an indicator that the lifevest enclosure 10 has been opened.

Figure 2:
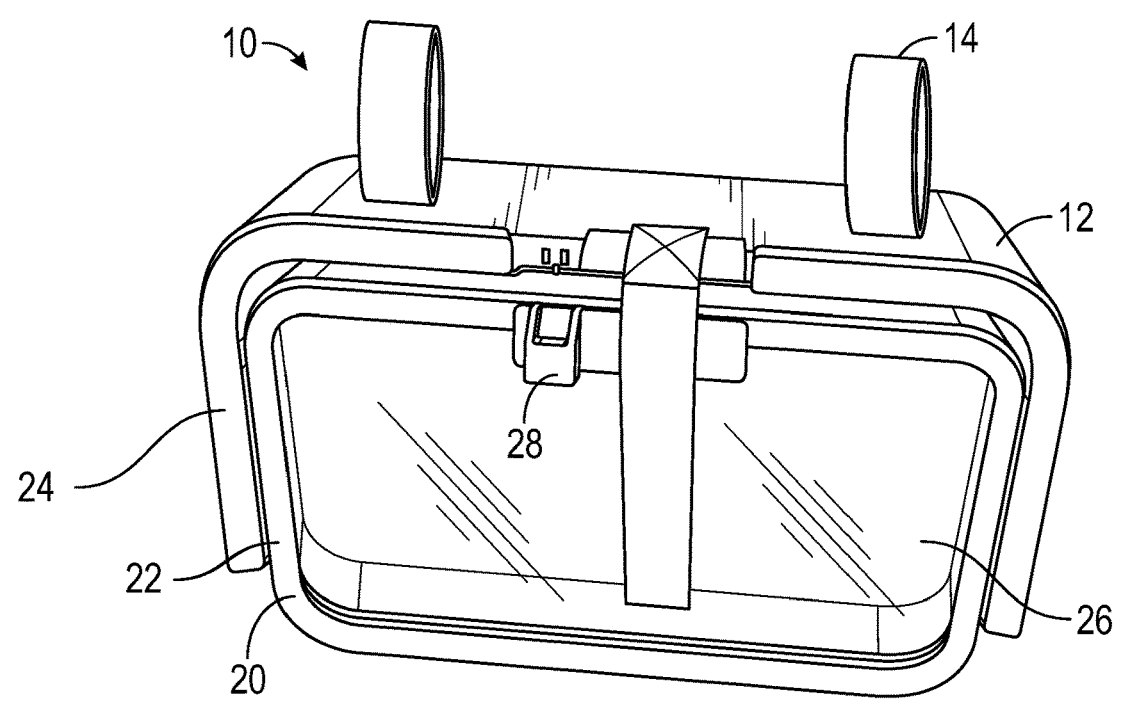
FIG. 2 is a front perspective view of the lifevest enclosure of FIG. 1.
Figure 3:
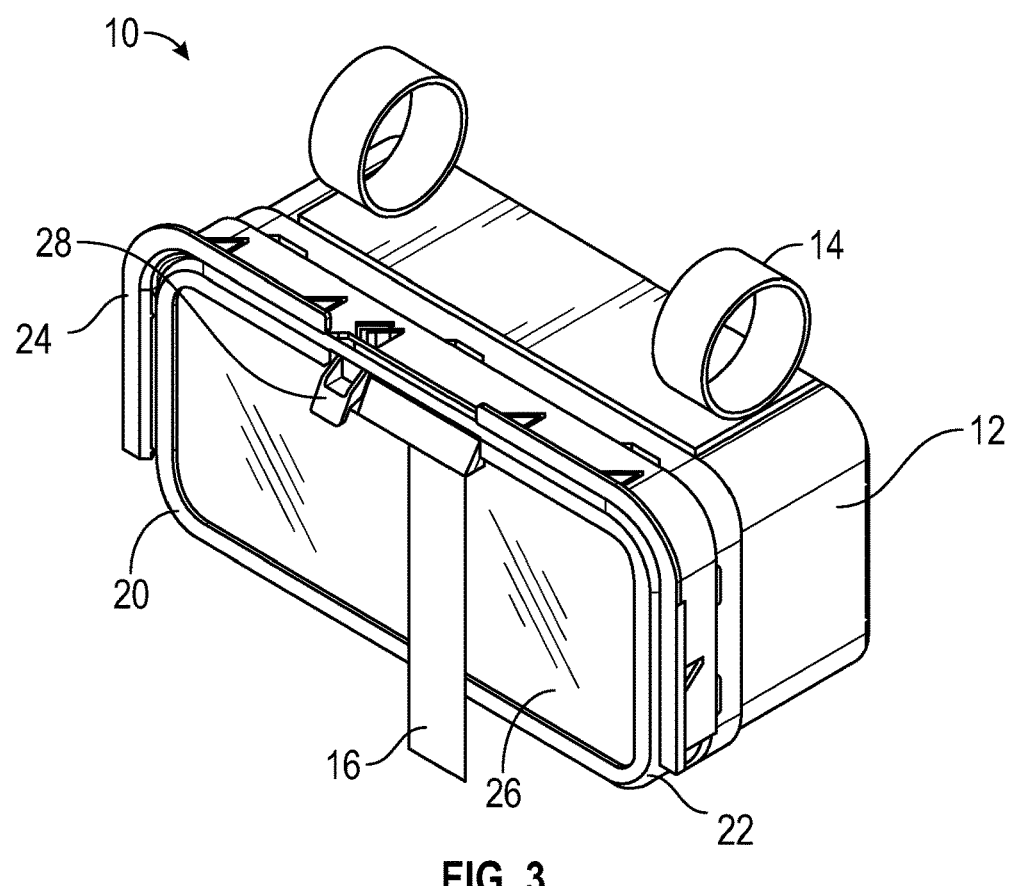
FIG. 3 is a top perspective view of the lifevest enclosure of FIG. 1.

In certain embodiments, the second frame member 24 may include similar features to those described with respect to the first frame member 22. For example, as illustrated in FIG. 4, the second frame member 24 may include a top side 24A, a bottom side 24B opposite the top side 24A, and peripheral sides 24C extending between the top side 24A and the bottom side 24B, thereby forming a perimeter of the second frame member 24. The second frame member 24 may further include an opening 24D within the perimeter formed by the top side 24A, bottom side 24B, and peripheral sides 24C. The second frame member 24 may be sized and shaped to complement the first frame member 22, as the first and second frame members 22, 24 are joined to each other as best illustrated in FIGS. 2-3.

As described above, the frame assembly 20 may further include the door member 26. In some embodiments, as illustrated in FIG. 4, the door member 26 may be positioned between the first frame member 22 and the second frame member 24 and disposed within the openings 22D, 24D of the first and second frame members 22, 24, respectively. In some embodiments, the door member 26 may be clear to allow a passenger or crew member to see within the interior compartment of the lifevest enclosure 10 without opening the frame assembly 20 (and thereby avoiding the need to break the seal formed by the tab 28 and/or sticker seal).

However, the door member 26 may be tinted or opaque. The door member 26 may further include designs or other ornamental features.

In some embodiments, the frame assembly 20 may be formed of a rigid material, such as, for example, a polymer material. Examples of such a rigid material may include, but are not limited to, low-density polyethylene, high-density polyethylene, polypropylene, polystyrene, polytetrafluoroethylene, polyvinyl chloride, polychlorotrifluoroethylene, carbon reinforced plastic, fiber reinforced plastics, acrylic modified polyvinyl chloride, polyetherimide resin, or any other suitable rigid material. The term "rigid material" is understood to mean a material which cannot be easily folded and can support its own weight when rested upon parallel edges of the material. Furthermore, the frame assembly 20 may be formed of a material having a tensile strength that may be at least 35 MPa.

In some embodiments, the lifevest enclosure 10 may comprise a weight in the range of 0.45 to 0.75 lbs.

In some embodiments, the frame assembly 20 may be sized and shaped to complement the base 12. For example, as best illustrated in FIGS. 2-4, the lifevest enclosure 10 may be rectangular. However, the lifevest enclosure 10 may be any suitable shape, including, but not limited to, circular, oval, square, polygon, or any other suitable shape.

The frame assembly 20 may be pivotally coupled to the base 12 via at least one attachment member 30. In some embodiments, as illustrated in FIG. 4, the attachment member 30 may include a first attachment portion 32 and a second attachment portion 34. The first attachment portion 32 may mirror the second attachment portion 34, wherein the first attachment portion 32 forms an upper portion and the second attachment portion 34 forms a lower portion such that that the first and second attachment portions 32, 34, respectively, form a perimeter. The attachment member 30 may further include one or more projection members 36 extending outwardly from a surface of the attachment member 30. In some embodiments, as illustrated in FIG. 4, the attachment member 30 includes a plurality of projection members 36, however the attachment member 30 may include any suitable number of projection members 36.

The lifevest enclosure 10 may further include a gripping portion 16. In some embodiments, as illustrated in FIGS. 1-3, the gripping portion 16 is a strap assembly, wherein a first end of the strap is coupled to the frame assembly 20. The gripping portion 16 may, for example, comprise a fixed end coupled to the door member 26 and a free end located opposite the fixed end. However, the gripping portion 16 may be coupled to other portions of the frame assembly 20, including, but not limited to, the first frame member 22 or the second frame member 24. The gripping portion 16 may be coupled to the frame assembly 20 via any suitable attachment means, including, but not limited to, hook and loop fasteners, adhesive, rivets, or any other suitable attachment means. Moreover, while the gripping portion 16 is illustrated in FIGS. 2-4 as a strap assembly, the gripping portion 16 may be any suitable structure upon which a user may grip. For example, the gripping portion 16 may include, but is not limited to, a projection, knob, handle, or any other suitable structure.

When assembled, a rear end of the attachment member 30 may be coupled to the base 12, while a front end of the attachment member 30 (i.e., where the projection members 36 extend) may be coupled to the frame assembly 20. In particular, the projection member 36 may interface with the notch member 22E of the first frame member 22 such that the second frame member 24 and the door member 26 are oriented between the attachment member 30 and the first frame member 22.

The lifevest enclosure 10 may have a closed, or sealed, configuration and an open, or unsealed, configuration. In the sealed configuration, the frame assembly 20 may be coupled to the base 12 thereby enclosing the interior in which a lifevest is stored and preventing access to the enclosed interior of the lifevest enclosure 10. In the sealed configuration, the lifevest enclosure 10 may be formed so as to meet DFS requirements. In particular, according to Regulation No. ARP5526, the DFS requirements state that a foreign object greater than 9.9 cm in length and 0.9 cm in diameter is prevented from entering the interior of the lifevest enclosure 10. In the open configuration, the frame assembly 20 may be pivoted away from the base 12 to allow access to the interior of the lifevest enclosure 10.

In operation, a user may grip the gripping portion 16 and pull in a direction away from the base 12 causing the frame assembly 20 to pivot away from the base 12, thereby moving the lifevest enclosure 10 from the closed, or sealed, configuration to the open, or unsealed, configuration. In particular, the first frame member 22 may pivot at pivot point formed at the notch member 22E.

In the following, further examples are described to facilitate the understanding of the invention:

Example A. A hybrid lifevest enclosure comprising:
a base for receiving a lifevest;
a frame assembly; and
at least one attachment member positioned between the frame assembly and the base for coupling the base to the frame assembly;
wherein the frame assembly is formed of a rigid material, and the base is formed of a flexible material;
wherein the lifevest enclosure comprises a sealed configuration in which the base is coupled to the frame assembly in a manner that prevents insertion of a foreign object having a length of 9.9 cm and a diameter of 0.9 cm into the sealed configuration without evidence that the sealed configuration has been unsealed.

Example B. The hybrid lifevest enclosure of any of the preceding or subsequent examples, wherein the flexible material is a fabric.

Example C. The hybrid lifevest enclosure of any of the preceding or subsequent examples, wherein the fabric comprises at least one of nylon, coated nylon, carbon foam, polybenzimidazole (PBI) fiber, canvas, polyester, coated fabric, duck cloth, tweed, bamboo, synthetic fabric, organic fiber, synthetic rubbers, or acrylic.

Example D. The hybrid lifevest enclosure of any of the preceding or subsequent examples, wherein the rigid material comprises at least one of low-density polyethylene, high-density polyethylene, polypropylene, polystyrene, polytetrafluoroethylene, polyvinyl chloride, polychlorotrifluoroethylene, carbon reinforced plastic, fiber reinforced plastics, acrylic modified polyvinyl chloride, or polyetherimide resin.

Example E. The hybrid lifevest enclosure of any of the preceding or subsequent examples, wherein the rigid material has a tensile strength of at least 35 MPa.

Example F. The hybrid lifevest enclosure of any of the preceding or subsequent examples, wherein the frame assembly comprises a first frame member and a second frame member.

Example G. The hybrid lifevest enclosure of any of the preceding or subsequent examples, wherein a weight of the hybrid lifevest enclosure is less than 0.685 lbs.

Example H. A hybrid lifevest enclosure comprising:
a base for receiving a lifevest;
a frame assembly; and
at least one attachment member positioned between the frame assembly and the base for coupling the base to the frame assembly;
wherein the frame assembly is pivotable relative the base;
wherein the frame assembly is formed of a rigid material, and the base is formed of a flexible material; and
wherein a weight of the hybrid lifevest enclosure is less than 0.685 lbs.

Example I. The hybrid lifevest enclosure of any of the preceding or subsequent examples, wherein the flexible material is a fabric.

Example J. The hybrid lifevest enclosure of any of the preceding or subsequent examples, wherein the fabric comprises at least one of nylon, coated nylon, carbon foam, polybenzimidazole (PBI) fiber, canvas, polyester, coated fabric, duck cloth, tweed, bamboo, synthetic fabric, organic fiber, synthetic rubbers, or acrylic.

Example K. The hybrid lifevest enclosure of any of the preceding or subsequent examples, wherein the rigid material comprises at least one of low-density polyethylene, high-density polyethylene, polypropylene, polystyrene, polytetrafluoroethylene, polyvinyl chloride, polychlorotrifluoroethylene, carbon reinforced plastic, fiber reinforced plastics, acrylic modified polyvinyl chloride, or polyetherimide resin.

Example L. The hybrid lifevest enclosure of any of the preceding or subsequent examples, wherein the rigid material has a tensile strength of at least 35 MPa.

Example M. The hybrid lifevest enclosure of any of the preceding or subsequent examples, wherein the frame assembly comprises a first frame member and a second frame member.

Example N. A passenger seat comprising:
a hybrid lifevest enclosure coupled to a seat tube of the passenger seat, wherein the hybrid lifevest enclosure comprises a sealed configuration;
wherein the hybrid lifevest enclosure comprises:
a base for receiving a lifevest;
a frame assembly;
at least one attachment member positioned between the frame assembly and the base for coupling the base to the frame assembly;
wherein the frame assembly is pivotable relative to the base;
wherein the frame assembly is formed of a rigid material and the base is formed of a flexible material; and
wherein, in the sealed configuration, the hybrid lifevest enclosure complies with Regulation No. ARP5526.

Example O. The hybrid lifevest enclosure of any of the preceding or subsequent examples, wherein Regulation No. ARP5526 requires that a foreign object having a length of 9.9 cm and a diameter of 0.9 cm cannot be inserted with in the sealed configuration lifevest enclosure without evidence that the sealed configuration has been unsealed.

Example P. The hybrid lifevest enclosure of any of the preceding or subsequent examples, wherein the flexible material is a fabric.

Example Q. The hybrid lifevest enclosure of any of the preceding or subsequent examples, wherein the fabric comprises at least one of nylon, coated nylon, carbon foam, polybenzimidazole (PBI) fiber, canvas, polyester, coated fabric, duck cloth, tweed, bamboo, synthetic fabric, organic fiber, synthetic rubbers, or acrylic.

Example R. The hybrid lifevest enclosure of any of the preceding or subsequent examples, wherein the rigid material comprises at least one of low-density polyethylene, high-density polyethylene, polypropylene, polystyrene, polytetrafluoroethylene, polyvinyl chloride, polychlorotrifluoroethylene, carbon reinforced plastic, fiber reinforced plastics, acrylic modified polyvinyl chloride, or polyetherimide resin.

Example S. The hybrid lifevest enclosure of any of the preceding or subsequent examples, wherein the rigid material has a tensile strength of at least 35 MPa.

Example T. The hybrid lifevest enclosure of any of the preceding or subsequent examples, wherein the frame assembly comprises a first frame member and a second frame member.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A hybrid lifevest enclosure comprising:
a base for receiving a lifevest;
a frame assembly comprising a first frame member and a second frame member;
at least one attachment member coupled to the first frame member and positioned between the frame assembly and the base for coupling the base to the frame assembly, wherein the frame assembly is pivotally coupled to the base via the at least one attachment member, and the second frame member is sandwiched between the at least one attachment member and the first frame member; and
a gripping portion coupled to the first frame member, the gripping portion comprising a first end coupled to the frame assembly and a second end opposite the first end, wherein the second end is a free end,
wherein:
the at least one attachment member extends around a perimeter of the base;
the frame assembly is formed of a rigid material, and the base is formed of a flexible material; and
the hybrid lifevest enclosure comprises a sealed configuration in which the base is coupled to the frame assembly in a manner that prevents insertion of a foreign object having a length of 9.9 cm or greater and a diameter of 0.9 cm or greater into the sealed configuration without evidence that the sealed configuration has been unsealed.

2. The hybrid lifevest enclosure of claim 1, wherein the flexible material is a fabric.

3. The hybrid lifevest enclosure of claim 2, wherein the fabric comprises at least one of nylon, coated nylon, carbon foam, polybenzimidazole (PBI) fiber, canvas, polyester, coated fabric, duck cloth, tweed, bamboo, synthetic fabric, organic fiber, synthetic rubbers, or acrylic.

4. The hybrid lifevest enclosure of claim 1, wherein the rigid material comprises at least one of low-density polyethylene, high-density polyethylene, polypropylene, polystyrene, polytetrafluoroethylene, polyvinyl chloride, polychlorotrifluoroethylene, carbon reinforced plastic, fiber reinforced plastics, acrylic modified polyvinyl chloride, or polyetherimide resin.

5. The hybrid lifevest enclosure of claim 1, wherein the rigid material has a tensile strength of at least 35 MPa.

6. The hybrid lifevest enclosure of claim 1, wherein a weight of the hybrid lifevest enclosure is less than 0.685 lbs.

7. A hybrid lifevest enclosure comprising:
a base for receiving a lifevest;
a frame assembly comprising a first frame member and a second frame member;
at least one attachment member coupled to the first frame member and positioned between the frame assembly and the base for coupling the base to the frame assembly, the frame assembly is pivotally coupled to the base via the at least one attachment member, and the second frame member is sandwiched between the at least one attachment member and the first frame member; and
a gripping portion coupled to the first frame member, the gripping portion comprising a strap, wherein a first end of the strap is coupled to the frame assembly and is a fixed end and a second end of the strap is a free end opposite from the fixed end;
wherein:
the at least one attachment member extends around a perimeter of the base;
the frame assembly is pivotable relative the base;
wherein the frame assembly is formed of a rigid material, and the base is formed of a flexible material; and
wherein a weight of the hybrid lifevest enclosure is less than 0.685 lbs.

8. An apparatus comprising:
a hybrid lifevest enclosure coupled to a seat tube of a passenger seat, wherein the hybrid lifevest enclosure comprises a sealed configuration;
wherein the hybrid lifevest enclosure comprises:
a base for receiving a lifevest;
a frame assembly comprising a first frame member and a second frame member;
at least one attachment member coupled to the first frame member and positioned between the frame assembly and the base for coupling the base to the frame assembly, wherein the frame assembly is pivotable relative to the base via the at least one attachment member, and the second frame member is sandwiched between the at least one attachment member and the first frame member; and
a gripping portion coupled to the first frame member wherein the gripping portion has a fixed end and a free end, wherein:
the attachment member extends around a perimeter of the base; and
the frame assembly is formed of a rigid material and the base is formed of a flexible material.

9. The apparatus of claim 8, wherein the at least one attachment member includes a projection member, wherein the projection member is configured to couple to a notch member of a frame member.

10. The apparatus of claim 8, wherein the at least one attachment member includes a projection member, wherein the projection member is configured to couple to a notch member of the first frame member that extends around a perimeter of the base.

11. The apparatus of claim 8, wherein the at least one attachment member includes a first attachment portion and a second attachment portion, the first attachment portion mirroring the second attachment portion along the perimeter of the base.

12. The apparatus of claim 8, wherein the frame assembly further comprises:

a door member located between the first frame member and the second frame member, wherein the at least one attachment member is configured to couple to the first frame member but not the second frame member.

13. The apparatus of claim 12, wherein the first frame member includes a first opening and the second frame member includes a second opening, the door member being disposed within the first and second opening.

14. The apparatus of claim 8, wherein the second frame member includes a top side, a bottom side, and two peripheral sides, the top side or the two peripheral sides including a flange.

15. The apparatus of claim 8, wherein the second frame member includes a tab which is a breakable seal attached to a top side of the second frame member.

16. The apparatus of claim 8, wherein the gripping portion is attached to a top side of the second frame member configured to be moved away from the base.

17. The apparatus of claim 16, wherein the gripping portion is a strap.

18. The apparatus of claim 12, wherein the door member is tinted or transparent.

19. The apparatus of claim 8, wherein the base includes one or more support members configured to engage a seat tube of a passenger seat.

20. The apparatus of claim 8, wherein the first frame member pivots at a pivot point formed at a notch member.

\* \* \* \* \*